US011777100B2

(12) United States Patent
Yoon et al.

(10) Patent No.: US 11,777,100 B2
(45) Date of Patent: Oct. 3, 2023

(54) LITHIUM METAL SECONDARY BATTERY HAVING IMPROVED LIFE CHARACTERISTICS

(71) Applicant: LG ENERGY SOLUTION, LTD., Seoul (KR)

(72) Inventors: Jong-Keon Yoon, Daejeon (KR); Sol-Ji Park, Daejeon (KR); Hyun-Woong Yun, Daejeon (KR); Kyoung-Ho Ahn, Daejeon (KR); Hoe-Jin Hah, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/874,911

(22) Filed: Jul. 27, 2022

(65) Prior Publication Data

US 2022/0367876 A1 Nov. 17, 2022

Related U.S. Application Data

(63) Continuation of application No. 16/980,701, filed as application No. PCT/KR2019/003957 on Apr. 3, 2019, now Pat. No. 11,437,626.

(30) Foreign Application Priority Data

Apr. 6, 2018 (KR) .................. 10-2018-0040566

(51) Int. Cl.
| | |
|---|---|
| *H01M 4/62* | (2006.01) |
| *H01M 50/446* | (2021.01) |
| *C08K 3/38* | (2006.01) |
| *C08K 7/00* | (2006.01) |
| *H01M 4/36* | (2006.01) |
| *H01M 10/052* | (2010.01) |
| *H01M 10/0562* | (2010.01) |
| *H01M 10/0565* | (2010.01) |
| *H01M 50/417* | (2021.01) |
| *C08G 61/04* | (2006.01) |

(52) U.S. Cl.
CPC ............ *H01M 4/628* (2013.01); *C08G 61/04* (2013.01); *C08K 3/38* (2013.01); *C08K 7/00* (2013.01); *H01M 4/366* (2013.01); *H01M 10/052* (2013.01); *H01M 10/0562* (2013.01); *H01M 10/0565* (2013.01); *H01M 50/446* (2021.01); *C08G 2261/147* (2013.01); *C08G 2261/1452* (2013.01); *C08G 2261/1644* (2013.01); *C08K 2003/385* (2013.01); *H01M 50/417* (2021.01); *H01M 2300/0068* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 6,004,695 A | 12/1999 | Goda et al. | |
| 9,099,758 B2 | 8/2015 | Kumar et al. | |
| 9,412,987 B2 | 8/2016 | Saito et al. | |
| 2010/0035157 A1 | 2/2010 | Nakamura | |
| 2012/0326079 A1 | 12/2012 | Kim et al. | |
| 2013/0022894 A1 | 1/2013 | Zou et al. | |
| 2014/0295263 A1 | 10/2014 | Iwama et al. | |
| 2016/0028127 A1 | 1/2016 | Ahn et al. | |
| 2016/0359209 A1 | 12/2016 | Schmiederer et al. | |
| 2017/0239854 A1* | 8/2017 | Zhang ................ H01L 21/4807 | |
| 2020/0095463 A1 | 3/2020 | Kim et al. | |

FOREIGN PATENT DOCUMENTS

| | | |
|---|---|---|
| JP | 2002-260742 A | 9/2002 |
| JP | 2011-174032 A | 9/2011 |
| JP | 2014-191912 A | 10/2014 |
| JP | 2016-58163 A | 4/2016 |
| KR | 10-2000-0052944 A | 8/2000 |
| KR | 10-1614885 B1 | 4/2016 |
| KR | 10-2016-0052351 A | 5/2016 |
| KR | 10-2017-0099375 A | 8/2017 |
| WO | WO 98/20573 A1 | 5/1998 |

OTHER PUBLICATIONS

Sulfite, available at https://en.wikipedia.org/wiki/Sulfite, date unknown.*
European Patent Office Extended Search Report dated Apr. 13, 2021 in corresponding EP Application No. 19781772.9.
International Search Report issued in PCT/KR2019/003957 (PCT/ISA/210), dated Jul. 30, 2019.

* cited by examiner

*Primary Examiner* — Anca Eoff
(74) *Attorney, Agent, or Firm* — Birch, Stewart, Kolasch & Birch, LLP

(57) ABSTRACT

Disclosed is a lithium metal secondary battery including a positive electrode, a negative electrode, a separator interposed between the positive electrode and the negative electrode, and a protective layer interposed between the negative electrode and the separator. The protective layer comprises an additive, and wherein the additive comprises a mixture of hexagonal boron nitride (BN) flakes and an ionomer comprising a sulfur (S)-containing anionic group and fluorine (F). The sulfur (S)-containing anionic group is at least one selected from the group consisting of $SO_4^{2-}$ and $SO_3^{-}$.

12 Claims, 1 Drawing Sheet

LITHIUM METAL SECONDARY BATTERY HAVING IMPROVED LIFE CHARACTERISTICS

CROSS-REFERENCE TO RELATED APPLICATIONS

This application is a Continuation of copending application Ser. No. 16/980,701, filed on Sep. 14, 2020, which is the U.S. National Phase of PCT/KR2019/003957, filed Apr. 3, 2019, and which claims priority under 35 U.S.C. § 119(a) to Application No. 10-2018-0040566, filed in Korea on Apr. 6, 2018, all of which are hereby expressly incorporated by reference into the present application.

TECHNICAL FIELD

The present disclosure relates to a lithium metal secondary battery. More particularly, the present disclosure relates to a lithium metal secondary battery which can provide improved life characteristics by adding a specific additive to a protective layer or solid electrolyte.

BACKGROUND ART

As electric, electronic, communication and computer industries have been developed rapidly, high-capacity batteries have been in increasingly in demand. To meet such demand, a lithium metal secondary battery using lithium metal or lithium alloy as a negative electrode having high energy density has been given much attention.

A lithium metal secondary battery refers to a secondary battery using lithium metal or a lithium alloy as a negative electrode. Lithium metal has a low density of 0.54 g/cm$^3$ and a significantly low standard reduction potential of −3.045V (SHE: based on the standard hydrogen electrode), and thus has been spotlighted as an electrode material for a high-energy density battery.

In such a lithium metal secondary battery, growth of lithium dendrites occurs on the negative electrode surface. Since such dendrites significantly affect the life characteristics and safety of a battery, there have been many limitations in developing batteries.

To inhibit growth of dendrites, various attempts have been made. One of the approaches is applying a protective layer directly to the negative electrode of a lithium metal secondary battery to inhibit growth of dendrites.

However, there is a problem in that ion transportability between a positive electrode and a negative electrode may be degraded due to the formation of such a protective layer.

DISCLOSURE

Technical Problem

The present disclosure is designed to solve the problems of the related art, and therefore the present disclosure is directed to providing a lithium metal secondary battery having improved life characteristics by adding an additive, wherein the additive comprises a mixture of electrically non-conductive hexagonal boron nitride (BN) flakes and an ionomer having a sulfur (S)-containing anionic group and fluorine (F), to the protective layer of a negative electrode or solid electrolyte.

Technical Solution

In one aspect of the present disclosure, there is provided a lithium metal secondary battery including a positive electrode, a negative electrode, a separator interposed between the positive electrode and the negative electrode, and a protective layer interposed between the negative electrode and the separator, wherein the protective layer includes an additive, and wherein the additive comprises a mixture of hexagonal boron nitride (BN) flakes and an ionomer having a sulfur (S)-containing anionic group and fluorine (F).

Herein, the protective layer may be a porous polymer layer, inorganic layer or a laminate comprising a porous polymer layer and an inorganic layer.

Herein, the protective layer may comprise the porous polymer layer, which may include any one selected from the group consisting of polyvinyl chloride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinylpyrrolidone, polyvinylidene fluoride, polyvinyl acetate, polyethylene-co-vinyl acetate, polyethylene oxide, polypropylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan and carboxyl methyl cellulose, or a mixture of two or more of them.

In addition, the inorganic layer may include any one selected from the group consisting of $SiO_2$, $BaTiO_3$, $Pb(Zr_xTi_{1-x})O_3$(PZT, $0<x<1$), $Pb_{1-x}La_xZr_{1-y}Ti_yO_3$(PLZT, $0<x<1$, $0<y<1$), $(1-x)Pb(Mg_{1/3}Nb_{2/3})O_{3-x}PbTiO_3$(PMNPT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, AlOOH, lithium lanthanum zirconium oxide (LLZO), $Si_3N_4$, TiC, $TiO_2$ and SiC, or a mixture of two or more of them.

In addition, the protective layer may have a thickness of 0.1 μm to 10 μm.

Meanwhile, the additive may be used in an amount of 50 wt % to 98 wt % based on the total weight of the protective layer.

In addition, the additive may include the hexagonal boron nitride flakes and the ionomer mixed at a weight ratio of 1:9 to 9:1.

In another aspect of the present disclosure, there is also provided a lithium metal secondary battery including a positive electrode, a negative electrode and a separator interposed between the positive electrode and the negative electrode, wherein the positive electrode and/or negative electrode includes a solid electrolyte, wherein the solid electrolyte includes an additive, wherein the additive comprises a mixture of hexagonal boron nitride (BN) flakes and an ionomer having a sulfur (S)-containing anionic group and fluorine (F).

Herein, the additive is added in the form of an additive mixture combined with the solid electrolyte, wherein the solid electrolyte may be any one selected from the group consisting of a polymer solid electrolyte, polymer gel electrolyte, sulfide-based solid electrolyte and an oxide-based solid electrolyte, or a mixture of two or more of them.

Advantageous Effects

According to the present disclosure, an additive, which is a mixture of electrically non-conductive hexagonal boron nitride (BN) flakes and an ionomer having a sulfur (S)-containing anionic group and fluorine (F), is added to the protective layer of a negative electrode or solid electrolyte. As a result, it is possible to maximize the improvement of the mechanical strength and ion transportability, to ensure an oxidation potential window and to maximize incombustibility.

Ultimately, it is possible to improve the life characteristics and safety of a battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a lithium metal secondary battery including a positive electrode, a negative electrode and a separator interposed between the positive electrode and the negative electrode. According to the present disclosure, the lithium metal secondary battery includes lithium metal as a negative electrode active material.

According to the present disclosure, the lithium metal secondary battery includes an additive, which is a mixture of hexagonal boron nitride (BN) flakes; and an ionomer including a sulfur (S)-containing anionic group and fluorine (F).

According to an embodiment of the present disclosure, the secondary battery includes a protective layer interposed between the negative electrode and the separator, wherein the protective layer includes an additive, which is a mixture of hexagonal boron nitride (BN) flakes; and an ionomer including a sulfur (S)-containing anionic group and fluorine (F). Hereinafter, the protective layer will be described in detail.

Figure 1:
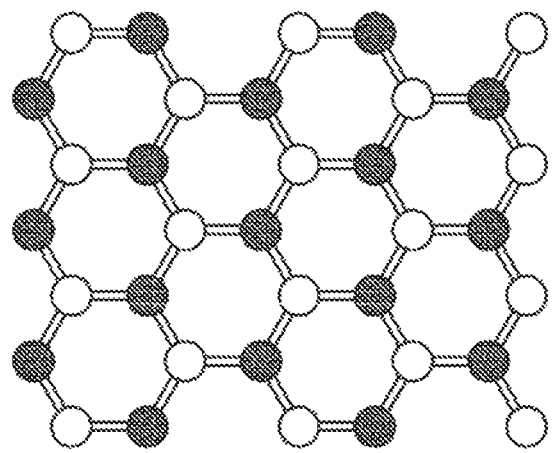
FIG. 1 is a schematic view illustrating the structure of hexagonal boron nitride (BN) flakes.

FIG. 1 is a schematic view illustrating the structure of hexagonal boron nitride (BN) flakes.

Referring to FIG. 1, hexagonal boron nitride (BN) flakes have a complete 2D structure similar to the structure of graphene, but are characterized in that they are electrically non-conductive. Such hexagonal boron nitride flakes improve the mechanical strength of the protective layer, show high heat conductivity, and can maximize a lithium (Li) ion transfer number by virtue of the properties of the boron (B) atom as a Lewis acid. According to an embodiment of the present disclosure, the hexagonal boron nitride flakes may have a size of 500 nm to 1 µm.

In addition, the ionomer contains fluorine (F) and has incombustibility, while the sulfur (S)-containing anionic group contains cations, such as $Li^+$, $H^+$, $Na^+$, $K^+$, or the like, and thus can maximize transportability of such cations.

Herein, the sulfur (S)-containing anionic group may be $SO_4^{2-}$, $SO_3^-$, or a mixture.

Further, the ionomer may be represented by the following Chemical Formula 1:

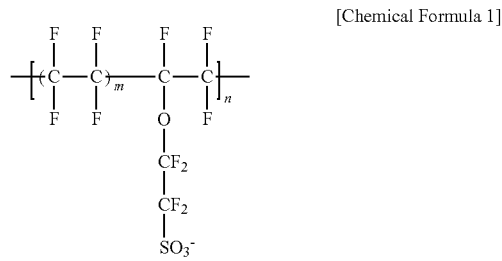

[Chemical Formula 1]

(wherein m:n may be 1:1 to 10:1).

In other words, since the protective layer includes the additive according to the present disclosure, it is possible to enhance the mechanical strength and ion transportability of the protective layer, to ensure an oxidation potential window, to improve incombustibility, and ultimately improve the life characteristics and safety of a battery.

According to the present disclosure, the protective layer inhibits growth of dendrites that may occur on the surface of a negative electrode and prevents chemical reactions between an electrolyte and a negative electrode. In addition, the protective layer may be a porous polymer layer, an inorganic layer containing inorganic particles, or a laminate of a porous polymer layer with an inorganic layer, and the above-mentioned additive is added thereto.

Herein, the porous polymer layer has a porous structure to facilitate introduction of an electrolyte to a negative electrode active material layer. When an electrolyte is injected after manufacturing an electrode assembly including electrodes and separators stacked successively, the protective layer in the form of a porous polymer layer can hold the electrolyte sufficiently therein. When the electrolyte is held sufficiently in the porous polymer layer, it is possible to delay the phenomenon of the depletion of the electrolyte during the operation of the lithium metal secondary battery, and thus delay the phenomenon of degradation of the life of the lithium metal secondary battery.

The porous polymer layer may include a polymer material, and the polymer material may include any one selected from the group consisting of polyvinyl chloride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinylpyrrolidone, polyvinylidene fluoride, polyvinyl acetate, polyethylene-co-vinyl acetate, polyethylene oxide, polypropylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan and carboxyl methyl cellulose, or a mixture of two or more of them.

In addition, the pores formed in the porous polymer layer may have a size of 0.01 µm to 10 µm, and the porous polymer layer may have a porosity of 5% to 95%.

Further, the method for forming a porous structure in the porous polymer layer is not particularly limited, and any conventional method for preparing a porous polymer film or sheet may be used with no particular limitation. For example, such a polymer sheet may be formed by a dry process including forming a porous sheet through melting/extrusion of a polymer resin, a wet process including forming pores by adding/extracting a plasticizer, a phase separation process, or a phase conversion process. In addition, the inorganic layer includes inorganic particles having high mechanical strength, in combination with or independently from the above-mentioned polymer material, so that it may function to inhibit growth of dendrites physically in the negative electrode of a lithium metal secondary battery. The inorganic layer may include any one selected from the group consisting of $SiO_2$, $BaTiO_3$, $Pb(Zr_xTi_{1-x})O_3$(PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$ (PMNPT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, AlOOH, lithium lanthanum zirconium oxide (LLZO), $Si_3N_4$, TiC, $TiO_2$ and SiC, or a mixture of two or more of them. According to an embodiment of the present disclosure, the porous property of the inorganic layer may be derived from the interstitial volumes formed among the inorganic particles, and such porous property may be realized to a desired level by controlling the content and/or diameter of the inorganic particles.

According to an embodiment of the present disclosure, the thickness of the protective layer is not particularly limited but it may be 0.1 μm to 10 μm. According to an embodiment of the present disclosure, the thickness of the protective layer may have a lower limit of 0.1 μm, 0.2 μm or 1 μm, and an upper limit of 10 μm, 8 μm or 5 μm. Within the range of 0.1 μm to 10 μm, the protective layer can hold an electrolyte sufficiently, and thus it is possible to delay depletion of electrolyte during the operation of a battery and to improve the life characteristics of a lithium metal secondary battery. When the thickness of the protective layer is smaller than the lower limit of 0.1 μm, the protective layer cannot function as a protective layer. When the thickness of the protective layer is larger than the upper limit of 10 μm, electrode resistance is undesirably increased.

Meanwhile, the protective layer may be formed directly on a negative electrode or separator by applying a solution or slurry containing the polymer or inorganic material thereto through a doctor blade process, solution casting process, dip coating process, spray coating process, spin coating process, or the like. However, the scope of the present disclosure is not limited thereto.

According to the present disclosure, the additive is added to the protective layer. Herein, the additive may be used in an amount of 50 wt % to 98 wt %, preferably 80 wt % to 95 wt %, and more preferably 90 wt % to 93 wt %, based on the total weight of the protective layer. When satisfying the range of 50 wt % to 98 wt %, it is possible to obtain an effect of enhancing life by inhibiting lithium dendrite desirably. When the content of additive is smaller than the lower limit of 50 wt %, resistance may be increased undesirably without any increase in life. When the content of additive is larger than the upper limit of 98 wt %, the content of binder, such as PVDF-co-HFP, contained in the protective layer is significantly low and causes poor flexibility, and thus the protective layer may be broken while it is coated.

In addition, the additive may include hexagonal boron nitride flakes and the ionomer mixed at a weight ratio of 1:9 to 9:1. When they are mixed at a weight ratio within the range of 1:9 to 9:1, it is possible to obtain not only an effect of maximizing lithium ion transportability and incombustibility derived from the ionomer, but also an effect of improving ion transportability and mechanical property derived from the boron nitride flakes.

Meanwhile, the positive electrode according to the present disclosure may be obtained by applying and drying an electrode mixture, which is a mixture of a positive electrode active material, a conductive material and a binder onto a positive electrode current collector. If necessary, the mixture may further include a filler.

The positive electrode current collector is formed to have a thickness of 3 μm to 500 μm. The positive electrode current collector is not particularly limited, as long as it causes no chemical change in the corresponding battery and has high conductivity. Particular examples of the positive electrode current collector may include stainless steel; aluminum: nickel; titanium; baked carbon; aluminum or stainless steel surface-treated with carbon, nickel, titanium or silver: or the like. It is possible to increase the adhesion of a positive electrode active material by forming fine surface irregularities on the surface of a current collector. The positive electrode current collector may have various shapes, such as a film, sheet, foil, net, porous body, foam and a non-woven web body.

The conductive material is added generally in an amount of 1 wt % to 50 wt % based on the total weight of the mixture including the positive electrode active material. The conductive material is not particularly limited, as long as it causes no chemical change in the corresponding battery and has conductivity. Particular examples of the conductive material include: graphite, such as natural graphite or artificial graphite; carbon black, such as acetylene black, Ketjen black, channel black, furnace black, lamp black or thermal black; conductive fibers, such as carbon fibers or metallic fibers; conductive tubes, such as carbon nanotubes; metal powder, such as carbon fluoride, aluminum or nickel powder; conductive whisker, such as zinc oxide or potassium titanate; conductive metal oxide, such as titanium oxide: and conductive materials, such as polyphenylene derivatives, or the like.

The binder is a component that assists binding between the electrode active material and the conductive material and binding to the current collector. In general, the binder is added in an amount of 1 wt % to 50 wt % based on the total weight of the mixture including the positive electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

The filler is a component that inhibits swelling of the positive electrode and is used optionally. The filler is not particularly limited, as long as it causes no chemical change in the corresponding battery and is a fibrous material. Particular examples of the filler include olefinic polymers, such as polyethylene or polypropylene; and fibrous materials, such as glass fibers or carbon fibers.

The positive electrode active material used herein is not particularly limited, as long as it is used conventionally for a lithium ion secondary battery as a positive electrode active material. According to an embodiment of the present disclosure, the positive electrode active material may include lithium metal oxides, such as lithium manganese oxides, lithium manganese nickel cobalt oxides or lithium cobalt oxides, lithium-free metal oxides or a mixture of two or more of them. Lithium metal oxides currently used as a positive electrode active material are capable of initial discharge. However, it is possible to incorporate lithium-free metal oxides, which are inexpensive and ensure safety, partially to a positive electrode, or it is possible to apply 100% of lithium-free metal oxides.

Herein, particular examples of such lithium-free metal oxides include vanadium oxide, manganese oxide, nickel oxide, cobalt oxide, niobium oxide, iron phosphate, or the like.

Meanwhile, the negative electrode may include a current collector, such as copper foil, alone or may include a negative electrode active material formed on the surface of the current collector. The negative electrode active material layer may include at least one element that belongs to alkaline metals, alkaline earth metals, Group 3B metals and transition metals. According to an embodiment of the present disclosure, non-limiting examples of alkaline metals include at least one metal selected from the group consisting of lithium (Li), sodium (Na), potassium (K), rubidium (Rb), cesium (Cs) or francium (Fr), preferably lithium. In addition, a material, such as graphite, may be used as a negative electrode active material. Most preferably, the negative electrode may be obtained by attaching lithium metal to a negative electrode current collector. The negative electrode current collector is formed to have a thickness of 3 μm to 500 μm. The negative electrode current collector is not particularly limited, as long as it causes no chemical change in the corresponding battery and has high conductivity. Particular examples of the negative electrode current collector may include copper; stainless steel; aluminum; nickel; titanium; baked carbon, copper or stainless steel surface-treated with carbon, nickel, titanium or silver; aluminum-cadmium alloy; or the like. In addition, similar to the positive electrode current collector, it is possible to reinforce the binding force to lithium metal by forming fine surface irregularities on the surface of a current collector. The negative electrode current collector may have various shapes, such as a film, sheet, foil, net, porous body, foam and a non-woven web body.

Meanwhile, the separator used in the lithium metal secondary battery according to the present disclosure is interposed between the positive electrode and the negative electrode, and is an electrically insulating thin film having high ion permeability and mechanical strength.

The separator may include a porous polymer substrate. The porous polymer substrate may be any porous polymer substrate used conventionally for a lithium secondary battery, and particular examples thereof include a polyolefin-based porous membrane or non-woven web, but are not limited thereto.

Particular examples of the polyolefin-based porous polymer membrane may include those formed of polymers including polyethylene, such as high-density polyethylene, linear low-density polyethylene, low-density polyethylene and ultrahigh-molecular weight polyethylene, polypropylene, polybutylene and polypentene, or the like, alone or in combination.

In addition to the polyolefin-based non-woven web, particular examples of the non-woven web may include those formed of polymers including polyethylene terephthalate, polybutylene terephthalate, polyester, polyacetal, polyamide, polycarbonate, polyimide, polyether ether ketone, polyether sulfone, polyphenylene oxide, polyether sulfone, polyphenylene oxide, polyphenylene sulfide, polyethylene naphthalene, or the like, alone or in combination. The non-woven web structure may be a spun-bonded non-woven web including long fibers or a melt blown non-woven web.

The thickness of the porous polymer substrate is not particularly limited but may be 1 μm to 500 μm, 3 μm to 300 μm, or 5 μm to 50 μm.

In addition, the size of pores present in the porous polymer substrate and the porosity are not particularly limited. However, the pore size and porosity may be 0.001 μm to 50 μm and 10% to 95%, respectively.

Meanwhile, according to an embodiment of the present disclosure, the separator may further include inorganic particles for heat resistance and physical strength. The inorganic particles are not particularly limited, as long as they cause no oxidation and/or reduction in the operating voltage range (e.g. 0-5V based on Li/Li$^+$) of an applicable electrochemical device. Particular examples of the inorganic particles may include any one selected from the group consisting of $SiO_2$, $BaTiO_3$, $Pb(Zr_xTi_{1-x})O_3$(PZT, $0<x<1$), $Pb_{1-x}La_xZr_{1-y}Ti_yO_3$(PLZT, $0<x<1$, $0<y<1$), $(1-x)Pb(Mg_{1/3}Nb_{2/3})O_{3-x}PbTiO_3$(PMNPT, $0<x<1$), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $AlOOH$, lithium lanthanum ziroconium oxide (LLZO), $Si_3N_4$, $TiC$, $TiO_2$ and $SiC$, or a mixture of two or more of them.

Further, the electrolyte salt contained in the non-aqueous electrolyte that may be used in the present disclosure is a lithium salt. Any lithium salt used conventionally for an electrolyte for a lithium secondary battery may be used with no particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $\mu F_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Particular examples of the organic solvent that may be contained in the non-aqueous electrolyte may include those used conventionally for an electrolyte for a lithium secondary battery with no particular limitation. For example, it is possible to use ethers, esters, amides, linear carbonates or cyclic carbonates, alone or in combination.

Typical examples of the organic solvent may include carbonate compounds, such as cyclic carbonates, linear carbonates or mixtures thereof.

Particularly, ethylene carbonate and propylene carbonate, which are cyclic carbonates among the carbonate organic solvents, have a high dielectric constant and dissociate the lithium salt in an electrolyte well. In addition, it is possible to prepare an electrolyte having high electrical conductivity, when using such cyclic carbonates in combination with low-viscosity low-dielectric constant linear carbonates, such as dimethyl carbonate and diethyl carbonate, at an adequate ratio.

Further, among the organic solvents, particular examples of the ethers may include any one selected from the group consisting of dimethyl ether, diethyl ether, dipropyl ether, methyl ethyl ether, methyl propyl ether, ethyl propyl ether, or a mixture of two or more of them, but are not limited thereto.

Among the organic solvents, particular examples of the esters include any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone, or a mixture of two or more of them, but are not limited thereto.

Injection of the non-aqueous electrolyte may be carried out in an adequate step during the process for manufacturing a lithium secondary battery depending on the manufacturing process of a final product and properties required for a final product. In other words, injection of the non-aqueous electrolyte may be carried out before the assemblage of a lithium secondary battery or in the final step of the assemblage of a lithium secondary battery.

The lithium secondary battery according to the present disclosure may be subjected to a lamination or stacking step of a separator with electrodes and a folding step, in addition to the conventional winding step. In addition, the battery casing may be a metallic can, a pouch-type battery casing of a laminate sheet including a resin layer and a metal layer, particularly a pouch-type battery casing.

In another aspect of the present disclosure, there is provided a lithium metal secondary battery including a positive electrode, a negative electrode and a separator interposed between the positive electrode and the negative electrode, wherein the positive electrode and/or the negative electrode further includes a solid electrolyte, wherein the solid electrolyte includes an additive, wherein the additive comprises a mixture of hexagonal boron nitride (BN) flakes and an ionomer having a sulfur (S)-containing anionic group and fluorine (F). In other words, according to an embodiment of the present disclosure, the positive electrode and/or the negative electrode may further include a solid electrolyte, and the additive may be added to the positive electrode and/or the negative electrode in the form of an additive mixture combined with the solid electrolyte. In addition, the lithium metal secondary battery may further include the protective layer.

Herein, the additive may be added in an amount of 50 wt % to 98 wt %, preferably 80 wt % to 95 wt %, and more preferably 90 wt % to 93 wt %, based on 100 wt % of the additive mixture. When satisfying the range of 50 wt % to 98 wt %, it is possible to obtain an effect of enhancing life by virtue of inhibition of lithium dendrites. When the amount is smaller than the lower limit of 50 wt %, a side effect including an increase in resistance may occur with no effect of enhancing life. When the amount is larger than the upper limit of 98 wt %, the content of solid electrolyte that may be contained in the additive mixture is excessively low to cause degradation of flexibility undesirably.

When the additive is added to the solid electrolyte, it is possible to improve the mechanical strength and ion transportability of the solid electrolyte, to ensure an oxidation potential window, and to improve incombustibility, and ultimately to improve the life characteristics and safety of a battery.

Herein, when the solid electrolyte is applied to a positive electrode, it is preferred to use a solid electrolyte having excellent oxidation stability. When the solid electrolyte is applied to a negative electrode, it is preferred to use a solid electrolyte having excellent reduction stability. Since the solid electrolyte mainly functions to transport lithium ions in the electrodes according to the present disclosure, any solid electrolyte having high ion conductivity, such as $10^{-5}$ s/m or more, preferably $10^{-4}$ s/m or more, may be used with no particular limitation.

Herein, the solid electrolyte may be a polymer solid electrolyte formed by adding a polymer resin to a solvated electrolyte salt, an organic electrolyte containing an organic solvent and an electrolyte salt, or a polymer gel electrolyte formed by incorporating an ionic liquid, monomer or oligomer to a polymer resin. In addition, the solid electrolyte may be a sulfide-based solid electrolyte having high ion conductivity or an oxide-based solid electrolyte having high stability.

For example, the polymer solid electrolyte may include a polyether polymer, polycarbonate polymer, acrylate polymer, polysiloxane polymer, phosphazene polymer, polyethylene derivatives, alkylene oxide derivatives, phosphate ester polymer, polyagitation lysine, polyester sulfide, polyvinyl alcohol, polyvinylidene fluoride, polymer containing an ionically dissociable group, or the like. In addition, the solid polymer electrolyte may include a polymer resin, such as a branched copolymer including polyethylene oxide (PEO) backbone copolymerized with a comonomer including an amorphous polymer, such as PMMA, polycarbonate, polydioxane (pdms) and/or phosphazene, comb-like polymer, crosslinked polymer resin, or the like, and may be a mixture of such polymers.

In addition, the polymer gel electrolyte includes an electrolyte salt-containing organic electrolyte and a polymer resin, wherein the organic electrolyte is used in an amount of 60 parts by weight to 400 parts by weight based on the weight of the polymer resin. There is no particular limitation in the polymer used for the gel electrolyte, and particular examples of the polymer include polyether polymers, PVC polymers. PMMA polymers, polyacrylonitrile (PAN), polyvinylidene fluoride (PVdF), poly(vinylidene fluoride-co-hexafluoropropylene: PVdF-HFP), or the like. In addition, a mixture of such polymers may be used.

In addition, the electrolyte salt is an ionizable lithium salt and may be represented by $Li^+X^-$. Preferably, the lithium salt may be any one selected from the group consisting of LiTFSI, LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2).2NLi$, lithium chloroborate, lithium lower aliphatic carboxylate, lithium imide 4-phenylborate and combinations thereof.

Meanwhile, in still another aspect of the present disclosure, there is provided a battery module including the lithium metal secondary battery as a unit cell, a battery pack including the battery module, and a device including the battery pack as a power source.

Herein, particular examples of the device may include, but are not limited to: power tools driven by an electric motor: electric cars, including electric vehicles, hybrid electric vehicles, plug-in hybrid electric vehicles, or the like: electric carts, including electric bikes and electric scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

1. Example 1—Manufacture of Negative Electrode

First, lithium metal foil having a thickness of 20 μm was attached to one surface of a copper current collector. Next, hexagonal boron nitride flakes and an ionomer represented by Chemical Formula 1 (wherein m is 4 and n is 1) were mixed at a weight ratio of 9:1 to prepare an additive. Then, the additive was added to polyvinylidene fluoride-co-hexafluoropropylene (PVdF-co-HFP) polymer to obtain a protective layer. Herein, the additive was used in an amount controlled to 92 wt % based on the total weight of the protective layer.

The resultant protective layer was formed on lithium metal foil to obtain a negative electrode.

2. Example 2—Manufacture of Lithium Metal Secondary Battery (1) Manufacture of Positive Electrode First, 94 parts by weight of $LiNi_{0.8}Mn_{0.1}Co_{0.1}O_2$ as a positive electrode active material, 2 parts by weight of carbon black as a conductive material and 4 parts by weight of polyvinylidene fluoride (PVdF) as a binder were added to N-methyl-2-pyrrolidone (NMP) as a solvent to prepare positive electrode active material slurry. Next, the positive electrode active material slurry was coated on one surface of an aluminum current collector to a thickness of 79 μm, followed by drying and pressing. Then, the resultant product was punched to a predetermined size to obtain a positive electrode.

(2) Manufacture of Lithium Secondary Battery

A separator (polypropylene-based porous polymer substrate) was interposed between the positive electrode and the negative electrode according to Example 1 to obtain a coin cell. An electrolyte including 1M $LiPF_6$ dissolved in a solvent containing fluoroethylene carbonate (FEC) and ethylmethyl carbonate (EMC) mixed at a volume ratio of 30:70 was injected to the coin cell to obtain a lithium metal secondary battery.

3. Comparative Example 1—Manufacture of Negative Electrode

A negative electrode was obtained in the same manner as Example 1, except that no additive was added and the protective layer was formed by using polyvinylidene fluoride-hexafluoropropylene (PVdF-co-HFP) alone, when forming the protective layer of a negative electrode.

4. Comparative Example 2—Manufacture of Lithium Metal Secondary Battery

A lithium metal secondary battery was obtained in the same manner as Example 2, except that the negative electrode according to Comparative Example 1 was used.

5. Comparative Example 3—Manufacture of Lithium Metal Secondary Battery

A negative electrode was obtained in the same manner as Example 1, except that no protective layer was used when preparing the negative electrode. Then, the negative electrode was used to obtain a lithium metal secondary battery in the same manner as Example 2.

6. Comparative Example 4—Manufacture of Lithium Metal Secondary Battery

A negative electrode was obtained in the same manner as Example 1, except that no hexagonal boron nitride flakes were used and the ionomer was added alone when preparing the protective layer of a negative electrode. Then, the negative electrode was used to obtain a lithium metal secondary battery in the same manner as Example 2.

7. Evaluation of Ion Conductivity of Protective Layer

The protective layer according to Example 1 and the protective layer according to Comparative Example 1 were evaluated for ion conductivity through impedance analysis. The results are shown in the following Table 1.

TABLE 1

|  | Example 1 | Comparative Example 1 |
|---|---|---|
| Ion conductivity | $17.0 \times 10^{-4}$ S/cm | $1.9 \times 10^{-4}$ S/cm |

It can be seen from the above results that the protective layer according to Example 1 shows an ion conductivity approximately 10 times higher than the ion conductivity of the protective layer according to Comparative Example 1.

8. Evaluation of Life Characteristics of Lithium Metal Secondary Battery

Figure 2:
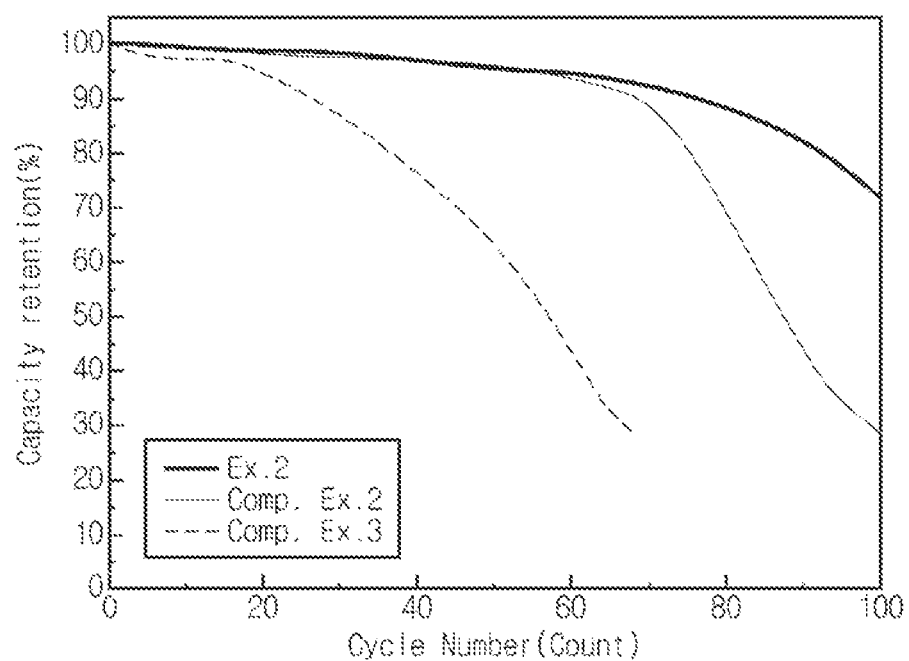
FIG. 2 is a graph illustrating the evaluation results of life characteristics of Examples and Comparative Examples.

Each of the lithium metal secondary batteries according to Example 2 and Comparative Examples 2-4 was evaluated for life characteristics. The results are shown in Table 2 and FIG. 2 (Example 2 and Comparative Examples 2 and 3).

TABLE 2

|  | Cycle number (Based on Retention 80%) |
|---|---|
| Example 2 | 92 |
| Comparative Example 2 | 75 |
| Comparative Example 3 | 36 |
| Comparative Example 4 | 78 |

After determining the cycle number where the capacity retention of a battery is 80%, Example 2 shows a retention of 80% after 92 cycles. However, Comparative Example 2 using a protective layer including no additive according to the present disclosure and Comparative Example 3 using no protective layer itself show a retention of 80% after 75 cycles and 36 cycles, respectively. It can be seen from the results that Example 2 shows significantly improved cycle characteristics as compared to Comparative Examples.

It should be understood that the detailed description is given by way of illustration only and various changes and modifications may be made without departing from the scope of the invention as defined in the following claims. Therefore, the embodiments disclosed herein are not intended to limit the scope of the present disclosure but are for illustrative purposes only, and the scope of the present disclosure is not limited thereto. It should be also understood that the scope of the present disclosure is defined by the following claims and all equivalents thereof are also included in the scope of the present disclosure.

The invention claimed is:

1. A lithium metal secondary battery comprising:
    a positive electrode;
    a negative electrode;
    a separator interposed between the positive electrode and the negative electrode; and
    a protective layer interposed between the negative electrode and the separator,
    wherein the protective layer comprises an additive, and wherein the additive comprises a mixture of hexagonal boron nitride (BN) flakes and an ionomer comprising a sulfur (S)-containing anionic group and fluorine (F), and
    wherein the sulfur (S)-containing anionic group is $SO_4^{2-}$.

2. The lithium metal secondary battery according to claim 1, wherein the protective layer is a porous polymer layer, an inorganic layer, or a laminate comprising a porous polymer layer and an inorganic layer.

3. The lithium metal secondary battery according to claim 2, wherein the protective layer is the porous polymer layer, which comprises at least one selected from the group consisting of polyvinyl chloride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinylpyrrolidone, polyvinylidene fluoride, polyvinyl acetate, polyethylene-co-vinyl acetate, polyethylene oxide, polypropylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan and carboxyl methyl cellulose.

4. The lithium metal secondary battery according to claim 2, wherein the protective layer is the inorganic layer, which comprises at least one selected from the group consisting of $SiO_2$, $BaTiO_3$, $Pb(Zr_xTi_{1-x})O_3$(PZT, 0<x<1), $Pb_{1-x}La_xZr_{1-y}Ti_yO_3$ (PLZT, 0<x<1, 0<y<1), $(1-x)Pb(Mg_{1/3}Nb_{2/3})O_{3-x}PbTiO_3$ (PMNPT, 0<x<1), hafnia ($HfO_2$), $SrTiO_3$, $SnO_2$, $CeO_2$, MgO, NiO, CaO, ZnO, $ZrO_2$, $Y_2O_3$, $Al_2O_3$, AlOOH, lithium lanthanum zirconium oxide (LLZO), $Si_3N_4$, TiC, $TiO_2$ and SiC.

5. The lithium metal secondary battery according to claim 1, wherein the protective layer has a thickness range of from 0.1 μm to 10 μm.

6. The lithium metal secondary battery according to claim 1, wherein the additive is used in an amount of 50 wt % to 98 wt % based on a total weight of the protective layer.

7. The lithium metal secondary battery according to claim 1, wherein the additive comprises the hexagonal boron nitride flakes and the ionomer mixed at a weight ratio of 1:9 to 9:1.

8. The lithium metal secondary battery according to claim 1, wherein the additive is used in an amount of 90 wt % to 93 wt % based on a total weight of the protective layer.

9. The lithium metal secondary battery according to claim 1, wherein the hexagonal boron nitride flakes have a size ranging from 500 nm to 1 μm.

10. A lithium metal secondary battery comprising:
a positive electrode;
a negative electrode;
a separator interposed between the positive electrode and the negative electrode,
wherein the positive electrode and/or negative electrode comprises a solid electrolyte, and
wherein the solid electrolyte comprises an additive, wherein the additive comprises a mixture of hexagonal boron nitride (BN) flakes with an ionomer comprising a sulfur (S)-containing anionic group and fluorine (F), and
wherein the sulfur (S)-containing anionic group is $SO_4^{2-}$.

11. The lithium metal secondary battery according to claim 10, wherein the additive is added in the form of an additive mixture combined with the solid electrolyte.

12. The lithium metal secondary battery according to claim 11, wherein the solid electrolyte comprises at least one selected from the group consisting of a polymer solid electrolyte, polymer gel electrolyte, sulfide-based solid electrolyte and an oxide-based solid electrolyte.

* * * * *